Dec. 17, 1957  L. M. CURTISS  2,816,949
ARMOURED CABLE MOUNTING
Filed Nov. 17, 1952
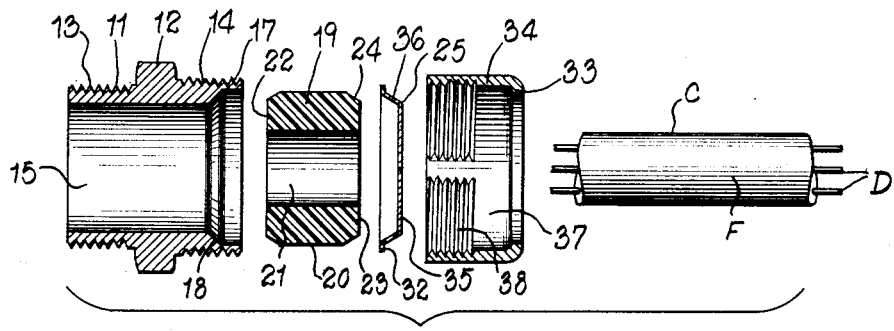
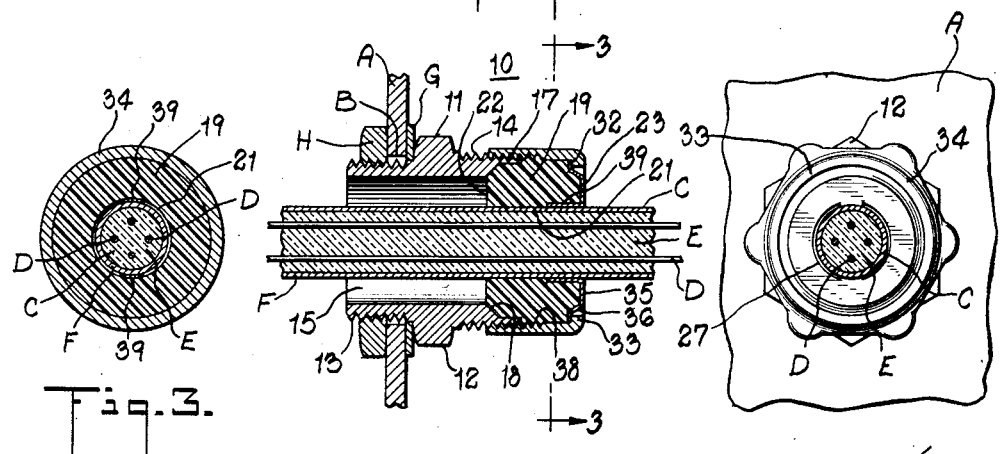
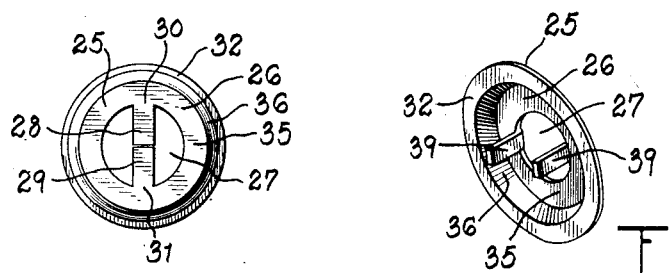
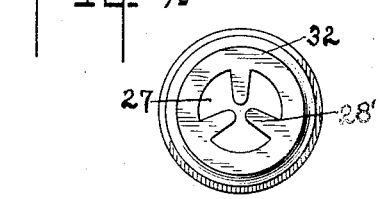
INVENTOR.
LAWRENCE M. CURTISS
BY
Warren S. Orton
ATTORNEY

United States Patent Office 2,816,949
Patented Dec. 17, 1957

2,816,949

ARMOURED CABLE MOUNTING

Lawrence M. Curtiss, Mountainside, N. J., assignor to The Thomas & Betts Co., Elizabeth, N. J., a corporation of New Jersey Application November 17, 1952, Serial No. 321,025

2 Claims. (Cl. 174—51)

The invention relates to an electric fitting for use generally in mounting a cable to a support therefor, which fitting is of the type which features a water-tight connection between the fitting and the cable, and the invention relates, specifically in those cases where the cable is of the metal-jacketed type, to a simple form of fitting by means of which the metal jacket of an armoured cable may be grounded automatically through the fitting onto the support.

It is a usual practice, in mounting cables and conduits therefor at the knock-out openings in outlet boxes and the like, to employ tubular steel fittings which are locked to a wall of such boxes at an opening therethrough; each of which fittings has fitted thereto a bushing made of rubber or a like resilient insulating material and through a bore in which bushing the cable to be mounted is inserted for centering the cable axially in the fitting.

These known forms of cable mounting fittings usually include a main body portion or connector of tubular form in which the bushing is contained, and include a gland nut in threaded engagement with the connector operative for squeezing the bushing between an end flange of the gland nut, usually through an end washer, and the connector and thus contracting the bushing onto the cable extending therethrough, in order to obtain a water-tight connection between the bushing and the cable.

An object of the invention is to provide a closure for the end of the bushing exposed through the gland nut to protect the entire exposed material of the bushing from detrimental effects of the environmental atmosphere, which closure will be capable of transmitting the squeeze pressure from the gland nut more or less uniformly across the entire exposed area of the bushing and in this way insure the transferring of the pressure in two directions, one axially to cause the bushing to bind firmly against the adjacent end of the connector and thus to provide a seal at this point, and the other radially to insure both a tight engagement of the bushing with the cable and of the closure with the cable, and to do this without twisting either the bushing or the cable while being installed.

Another object of the invention, particularly relating to the situation where the cable is of the type which is provided with a metal jacket, is to provide as part of the fitting a grounding connection for grounding the metal jacket through the fitting onto the box wall or other support for the fitting.

Broadly, these objectives are attained by adding to the usual fittings above defined a rigid disc of conductive metal in place of the usual washer, disposed as above noted as a facing lapping the exposed end of the bushing and particularly designed for forming an electric path of low ohmic resistance between the metal jacket of the cable and the pressure flange of the gland nut.

Various other objects and advantages of the invention will be in part obvious from an inspection of the accompanying drawings and in part will be more fully set forth in the following particular description of one form of armoured cable mounting and two forms of conductive discs embodying the invention, and the invention also consists in certain new and novel features of construction and combination of parts hereinafter set forth and claimed.

In the drawings:

Fig. 1 is an exploded view in axial section of the component parts of a fitting constituting a preferred embodiment of the invention, together with a length of a metal armoured and mineral-insulated cable for use with the fitting;

Fig. 2 is an assembled view in axial section of the finished fitting made from the parts shown in Fig. 1 and shown in position locked to an outlet box wall forming a grounding support;

Fig. 3 is a transverse sectional view showing the interlocking of the featured disc with the bushing and taken on the line 3—3 of Fig. 2, looking in the direction indicated by the arrows;

Fig. 4 is a view in end elevation of the assembly shown in Fig. 2, looking at the showing from its exposed right end;

Fig. 5 is a view of the blank disc of Fig. 1 before its tabs are bent to form the contact strips for engaging the cable;

Fig. 6 is a perspective view of the completed disc with the tabs bent as shown in Figs. 2–4 to contact the cable jacket; and Fig. 7 is a view similar to Fig. 5 showing a modified form of disc.

In the drawings and referring first to the parts which make up the fitting 10, there is shown a steel connector 11 of tubular form provided adjacent its mid-length with an outstanding hex flange 12. The connector has its opposite ends threaded to form at one end a box-engaging nipple 13 of relatively small external diameter, and at its other end a gland-nut-engaging nipple 14 having an external diameter slightly larger than that of the nipple 13. The connector is provided with a cylindrical bore 15 extending axially therethrough and with its end in the nipple 13 enlarged to form an outer end ring 17. Between the ring 17 and the cylindrical portion of the bore 15 there is formed an annular, outwardly-facing, beveled seat 18.

A bushing 19 of tubular form with a cylindrical mid-portion 20 has an external diameter to fit somewhat snugly within the end ring 17 and has a cylindrical bore 21 having a diameter equal to the external diameter of the cable for which it is intended to fit.

Opposite ends of the bushing form flat faces 22 and 23 and between these faces and the perimeter of the bushing the ends are beveled as shown at 24 so that either end of the bushing may fit against the beveled seat 18.

The bushing illustrated is formed of a rubber-like, slightly elastic and compressible composition, one form of which is a synthetic rubber, marketed under the name of "neoprene."

Referring to Figs. 1 and 5, there is disclosed a metal blank 25 stamped from sheet metal into a dished form to give it rigidity and from which blank the disc or retaining ring 26 as shown in Fig. 6 is formed incidental to the mounting of the cable therein, as hereinafter described.

The blank is provided at its center with an opening 27 having a diameter which when fully open is equal to that of the cable for which it was designed, so that the cable may be passed therethrough with a snug but sliding fit. However, it is within the scope of the disclosure to make the opening 27 of a size to accommodate a range of cable diameters.

As shown in the form disclosed in Fig. 5 a pair of tabs 28, 29 extend in transverse alignment diametrically from the opposite sides of the opening 27 and as shown in Figs. 1 and 5 these tabs extend in the plane of the blank and their root ends form integral hinge connections 30, 31 with the balance of the blank. In the form shown in Fig. 7 three similar tabs 28' are disclosed.

The blank, either form, as well as the resulting disc is outlined by an outstanding rigid marginal flange 32 fashioned to be engaged flatwise by a pressure flange 33 of a gland nut 34. Between the marginal flange 32 and the flat portion 35 of the disc outlining the opening 27 there is provided a beveled rim 36 fashioned to fit the adjacent bevel 24 of the bushing. The blank is stamped from a sheet of highly conductive and somewhat rigid metal and in the instant case is made of brass.

The gland nut 34 is provided with a bore 37 threaded as indicated at 38 for telescopically engaging the nipple 14. At its outer end the nut is provided with the pressure flange 33 projecting as a flat ring slightly into the bore 37. The bushing and disc are snugly housed within the gland nut and as a unit are between the beveled seat 24 on the connector and the flange 33 of the gland nut.

As illustrated, the cable C for which the fitting is intended to be used is of the mineral-insulated type and is provided with four conductors D embedded in insulating material E and provided with an outer stiff jacket F of copper. It is appreciated, however, that the fitting herein featured may be used with a cable other than a metal-jacketed cable where the grounding features are not utilized.

For the purpose of showing one situation in which the instant disclosure might be used, there is disclosed in Figs. 2 and 4 a metallic outlet box wall A provided with the usual knock-out hole B and into which opening is inserted the nipple 13 end of the connector. In the situation illustrated a soft metal washer G is located between the wall and the hex flange 12 and a steel lock nut H threaded on the nipple 13 acts to lock the fitting to the wall following conventional practices in this respect.

This clamping of the box wall in the part thereof outlining the knock-out hole B between the washer-faced flange 12 and the lock nut H places the connector, considered as a whole, in grounding engagement with the box wall.

Assuming the connector is so secured in place, the bushing is inserted into the ring 17 and located with the advance bevel 24 engaging its seat 18 on the connector. The blank 25 is then located with its beveled rim 36 engaging the adjacent bevel 24 of the bushing and the gland nut is threaded onto the nipple 14 and turned manually sufficiently to hold the blank momentarily to the bushing and to hold the bushing to the adjacent end of the connector. With the parts so positioned one end of the cable C is then forcefully inserted axially through the opening 27, which causes the end of the copper jacket to bear on the initially aligned tabs to force them inwardly, bending about their hinge connections at 30, 31 to assume the parallel relation shown in Figs. 2–4 and thus to form a pair of contact strips 39 bearing resiliently on the copper jacket at opposite sides thereof.

The contact strips are resilient, provide a springy form of contact with the jacket of the conductor, and are dimensioned to provide collectively the area of contact between the metal jacket and the disc sufficient to carry off any electric charges on the metal jacket. The contact strips are bent to intrude into the bore wall of the bushing and into an interlocked relation thereto so that there is no subsequent possibility of relative rotary movement between the disc and bushing during the final tightening of the gland nut. In this way the disc acts as a washer between the gland nut and the bushing and for this reason the disc is sometimes referred to hereinafter as a retaining ring.

It is noted that the contact-forming strips 39 do not extend full length of the bore of the bushing and are designed to offer the least possible reduction in the area of the bore wall of the bushing in its binding engagement with the cable jacket. In this way the contact strips do not break the water-seal at the inner end of the bushing.

Finally, the hex gland nut 34 is advanced until it can be turned no further. During the final turning of the gland nut its pressure flange 33 acts on the marginal flange 32 of the brass disc and therethrough onto the bushing to do two things: First, the pressure from the nut is directed axially to force the bushing as a whole onto its seat at the end of the connector, thus sealing the joint at the seat 18. Also, the nut flange bears on the disc flange for its entire perimeter to shift the disc as a whole against the entire exposed outer face of the bushing. This has the effect of distending the bushing radially in opposing relation and thus increasing the binding action both between the bushing and inner face of the gland nut and between the bushing and the metal of the cable, thus additionally sealing the interior of the fitting from the environmental atmosphere. Also, the pressure transmitted through the bushing itself acts to bind the contact strips against the metal jacket of the cable and in this way contact between the disc and the outer face of the cable is maintained irrespective of what material the outer face of the cable might be made.

The three-tab form shown in Fig. 7 has an advantage over the two-tab form shown in the preceding figures, in that they can be formed of less width and thus can be more easily bent than the wider form of tabs shown in Figs. 5 and 6. The three tabs 28' are arranged 120 degrees apart and have a tendency to center the cable in the opening 27 as the cable is forced therethrough. When bent the tabs 28' define a cylinder having the diameter of the jacket C.

I claim:

1. An electric fitting for effecting a grounded, watertight connection between an outlet box and a metal-jacketed cable conductor, comprising in combination, a tubular connector having externally threaded opposite end portions including a flange therebetween, adapted to be secured in an opening in one wall of said outlet box by means of a lock-nut threaded on one of said end portions, the opposite end portion of said tubular connector being provided with a counterbore terminating in an inclined shoulder, a gland-nut threaded on the opposite end portion of said tubular connector having an internal flange at its outer end defining an annular shoulder presenting an opening substantially larger than the size of said cable, a resilient, rubber-like bushing having tapered opposite ends seated at one end on said inclined shoulder, and a spring metal disc of frusto-conical configuration in cross section having a flange about its base end in the plane thereof seated on the opposite end of said bushing with its flange clamped between said bushing and the annular shoulder within said gland-nut whereby said bushing is shielded against exposure, said disc being provided centrally thereof with spaced openings formed on a radius corresponding substantially to that of said cable to define individual aligned fingers integral with and in the plane thereof, whereby when a cable is intruded through said disc and said bushing into said tubular connector the cable is supported centrally of said tubular connector and said fingers bent out of the plane of said disc into intimate contact with said cable to establish a ground connection through said outlet box.

2. An article of manufacture for use as a closure for the flanged end opening of a gland-nut whereby to shield an exposed end face of a resilient rubber-like bushing adapted for supporting a metal-jacketed cable centrally of an electric fitting and for grounding the cable supported by the fitting onto the same, comprising a spring metal disc of frusto-conical configuration in cross-section having a flange about its base end in the plane thereof and adapted to be clamped between an end face of the fitting and the inner face of the flanged end opening of the gland-nut on the fitting, said disc having a pair of spaced openings formed centrally thereof on a radius corresponding substantially to that of the cable to define an integral strip between said openings, said strip being severed at a point corresponding to the axial center of said disc to provide contact members adapted to be bent out of the plane of the disc for contact with the cable when extended through the gland-nut and bushing into said electric fitting.

References Cited in the file of this patent

UNITED STATES PATENTS

| | | |
|---|---|---|
| 2,021,745 | Pfefferle et al. | Nov. 19, 1935 |
| 2,113,735 | Mascuch | Apr. 12, 1938 |
| 2,164,311 | Doran | July 4, 1939 |
| 2,447,749 | Hallett | Aug. 24, 1948 |
| 2,465,069 | Dean et al. | Mar. 22, 1949 |
| 2,564,302 | Fraser | Aug. 14, 1951 |
| 2,694,187 | Nash | Nov. 9, 1954 |

FOREIGN PATENTS

| | | |
|---|---|---|
| 7,995 | Great Britain | Apr. 3, 1909 |
| 813,052 | Germany | Sept. 6, 1951 |